July 23, 1935.  C. C. SALMONS  2,009,024
VEHICLE SEAT
Filed Sept. 6, 1932  3 Sheets-Sheet 2
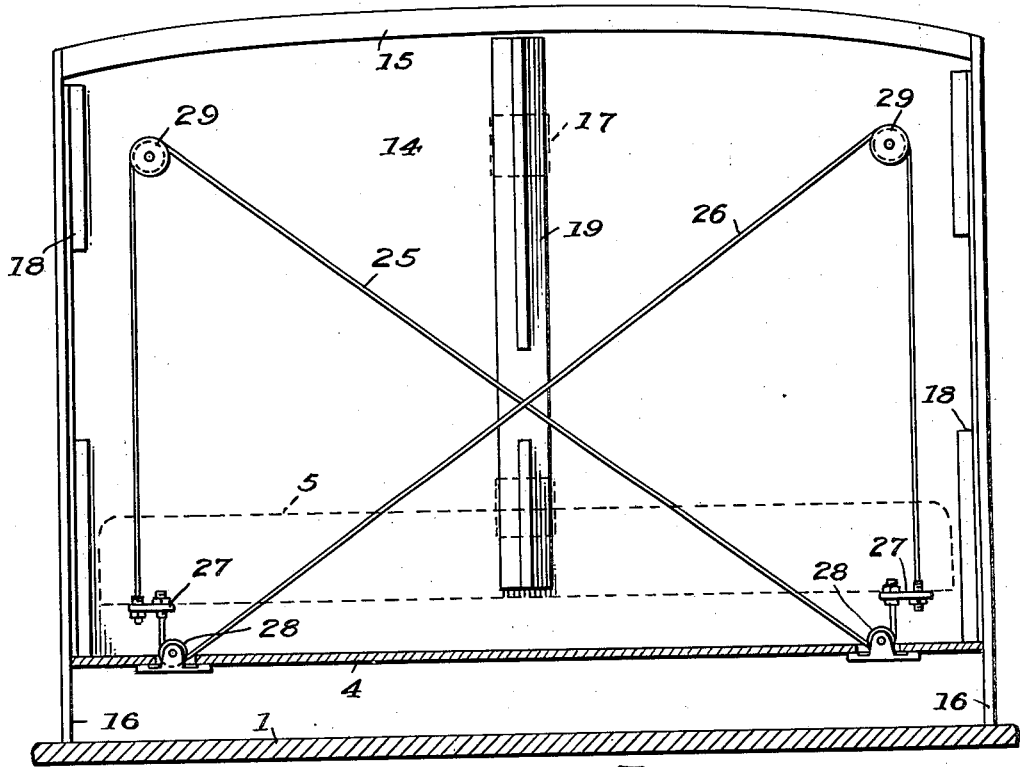
Fig. 7.
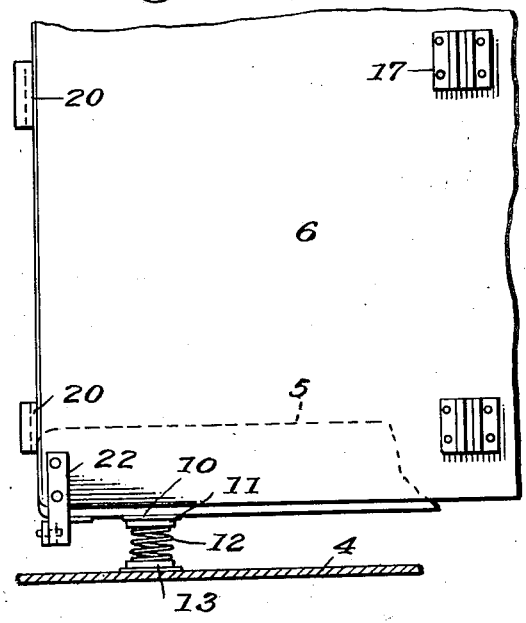
Fig. 8.
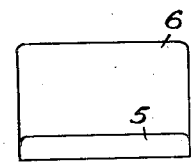
Fig. 15.
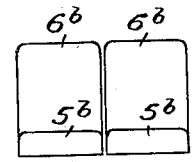
Fig. 16.
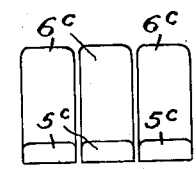
Fig. 17.
INVENTOR:
Claude C. Salmons.
BY 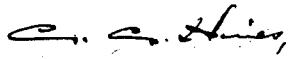
ATTORNEY.

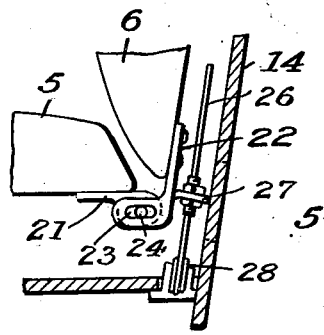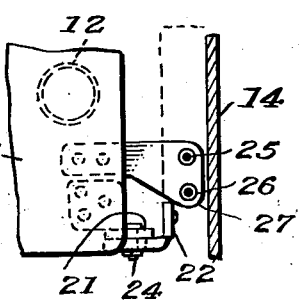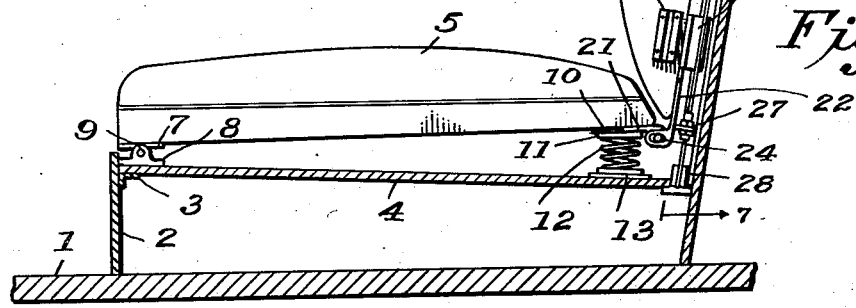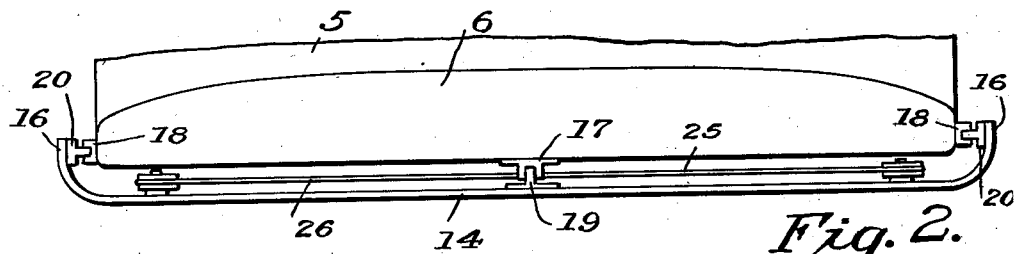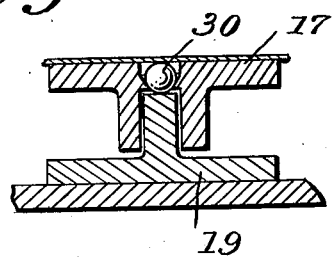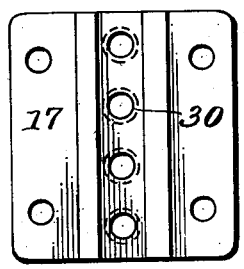

July 23, 1935.  C. C. SALMONS  2,009,024
VEHICLE SEAT
Filed Sept. 6, 1932    3 Sheets-Sheet 3
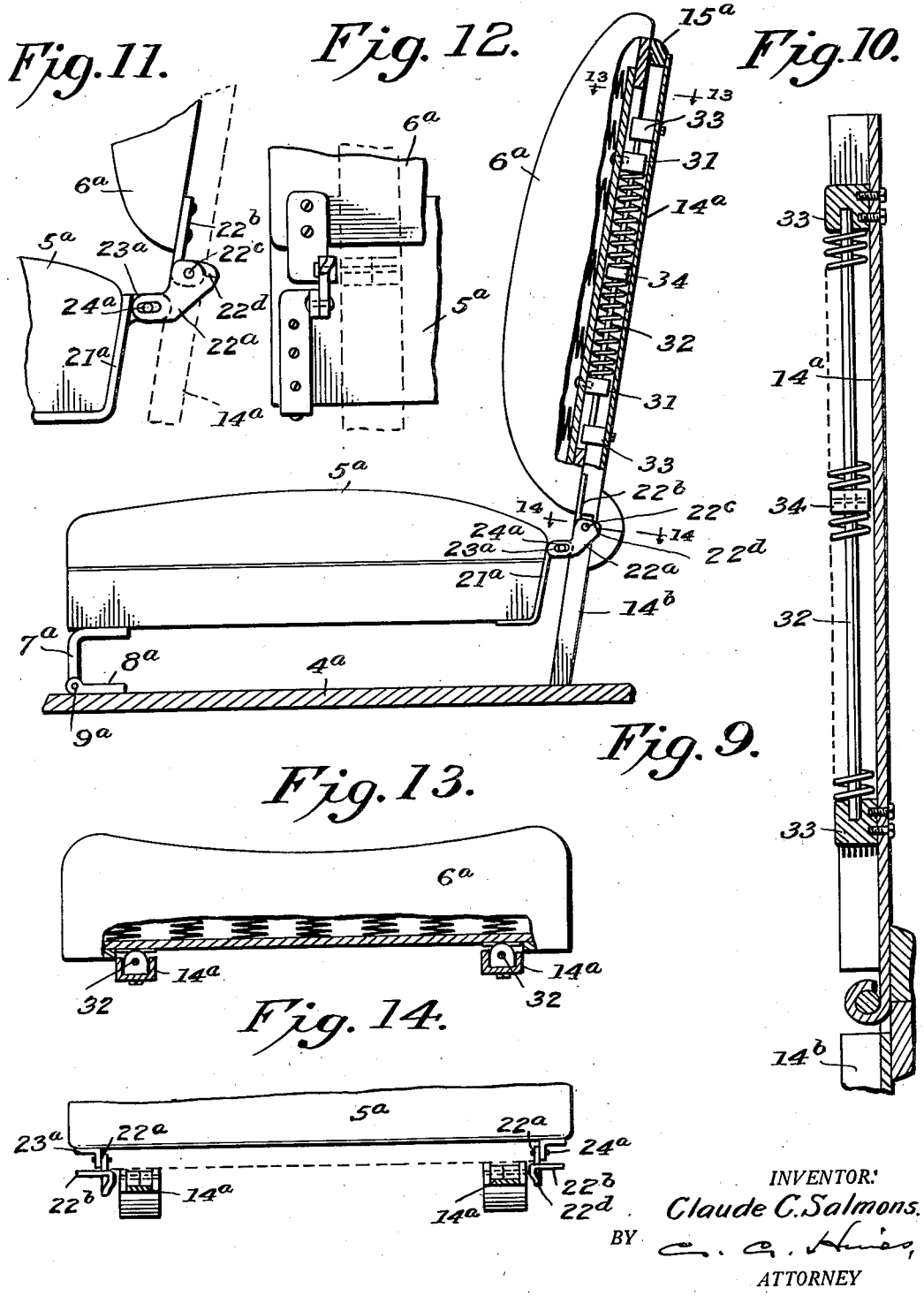

Patented July 23, 1935

2,009,024

UNITED STATES PATENT OFFICE 2,009,024

VEHICLE SEAT

Claude C. Salmons, Ventnor City, N. J., assignor of one-fourth to William B. Powell, Cape May Court House, N. J.

Application September 6, 1932, Serial No. 631,926

5 Claims. (Cl. 155—53)

This invention relates to seats for automobiles and other vehicles, and particularly to improvements in cushioned seats for such vehicles.

One object of the invention is to provide a cushioned automobile or other vehicle seat having a floating motion, that is, a motion in which the seat and its back move vertically to cushion and compensate for body motions of the vehicle and to secure an easy and velvety riding action.

A further object of the invention is to provide a seat construction of the character described which may be employed upon existing vehicles, and in connection with existing styles of seats, without radical or material changes in the form or construction thereof.

A still further object of the invention is to provide novel and improved means for independently and conjointly supporting the seat and its back, and permitting cushioning movements thereof, whereby the seat parts are adapted to compensate for and accommodate themselves to movements of the vehicle body and occupant or occupants of the seat.

A still further object of the invention is to provide equalizing means to compensate for different load weights at different ends of a seat, so as to ensure the arrangement and travel of a seat in a true horizontal plane, whether or not the seat is occupied by two or more persons, or persons of different weights, thus more fully conducing to comfortable riding, while at the same time preventing binding of the seat parts or interference with their freedom of cushioning movements.

A still further object of the invention is to provide a floating seat construction which is applicable to sedan, coach and other automobile or vehicle seats comprising a single seat or seat section or a plurality of seats or seat sections.

With these and other objects in view, the invention consists of the features of construction, combination and arrangements of parts, hereinafter fully described and claimed, reference being had to the accompanying drawings, in which:—

Fig. 1 is a view in end elevation, and partially in vertical front to rear section of an automobile seat embodying my invention.

Fig. 2 is a fragmentary top plan view thereof, partially in horizontal transverse section.

Fig. 3 is a fragmentary end elevation, parts in section, showing the hinge and equalizer cable connections at one of the rear corners of the seat.

Fig. 4 is a sectional plan view of parts shown in Fig. 3.

Fig. 5 is a face view of one of the guide members on the seat back.

Fig. 6 is a horizontal transverse section through one of the guide members on the seat back and the coacting guide member on the seat back support.

Fig. 7 is a vertical transverse section taken substantially on line 7—7 of Fig. 1, showing particularly the construction and arrangement of the parts of the equalizer.

Fig. 8 is a fragmentary rear elevation of the seat back and a section through the seat base.

Fig. 9 is a view similar to Fig. 1 showing the application of the invention to a coach type of front seat, and illustrating a modification in the cushioning means.

Fig. 10 is a vertical front-to-rear section through the seat back and seat back support shown in Fig. 9 and illustrating more particularly features of construction embodied therein.

Fig. 11 is a fragmentary end elevation of parts shown in Fig. 9.

Fig. 12 is a rear elevation of the same.

Fig. 13 is a horizontal transverse section on line 13—13 of Fig. 9.

Fig. 14 is a similar section on the line 14—14 of Fig. 9.

Figs. 15, 16 and 17 are diagrams showing several of the many types of seats in connection with which the invention may be used.

Referring now more particularly to Figs. 1 to 8, inclusive, of the drawings, in which I have shown the application of my invention to a single or unitary type of seat, such as employed at the front or back of an automobile sedan, I designates the vehicle floor upon which is arranged a seat support 2 which may, in practice, form a tool box or storage compartment disposed beneath the seat and normally covered or closed thereby. This support 2 as shown is provided at the front with a ledge or recess 3, which may consist of a channel iron, forming a fulcrumed support for the forward edge of a seat baseboard 4, which baseboard may normally serve as a cover for the top of the compartment formed by the base support 2.

Superposed upon the seat base 4 is a seat 5 with which is associated a seat back 6. The seat and seat back are preferably of the cushioned upholstery type commonly used and each is preferably, as shown, of unitary construction and formed to provide a seat of a width suitable for two or three persons, although, of course, the same structure, as hereinafter fully described, may be embodied in a seat designed for a single person, two persons, or three or more persons, as desired. The seat itself may, also, consist of a single piece or a seat bottom with a detachable cushioned top, although a seat of conventional unitary type is preferred.

The seat 5 and its back 6, in addition to being internally cushioned by springs or other suitable means in the usual manner, are mounted so as to have a yielding floating motion in a vertical plane. To this end, the seat 5 is provided adjacent to each of its front corners with a hinge member 7 for coaction with a complementary hinge member 8 on the seat base 4, through the alined eyes of which hinge members a pivot pin or bolt 9 is passed to pivotally and detachably connect the forward edge of the seat 5 with the base 4. The rear portion of the seat 5 is free from direct attachment to the base 4 and is provided adjacent to each of its rear corners with an abutment member or plate 10 to rest upon an abutment member or cap 11 at the upper end of a coiled cushioning spring 12 seated at its lower end in a socket 13 fastened to the seat base 4, whereby the rear portion of the seat 5 is resiliently supported to adapt said seat to have free and independent floating motion in a vertical plane.

The seat back 6 is mounted for vertical sliding floating motion on a seat back support 14, which may consist of the rear wall of the vehicle, in the case of the rear coach or sedan seat, or of a partition dividing the forward driver's compartment of the vehicle from the rear passenger compartment thereof. This seat back may be of metal or wood or of composite construction and is provided with a forwardly projecting top bead or rail 15 and forwardly projecting end portions or rails 16, providing between it and the rear surface of the seat back 6 proper a space or chamber to receive interposed and interconnecting guiding and equalizing means, whereby the back 6 is accurately guided for movements in a vertical plane and the back 6 and seat 5 mounted to always maintain a level position, regardless of the amount of weight or load upon the seat at opposite sides of its transverse center.

As shown particularly in Figs. 1, 2, 3, 5, 6 and 8, the back 6 is provided centrally and at each end with channeled guide members 17 and 18 for sliding engagement with guides 19 and 20 upon the center and end rails of the back support 14, whereby the seat back 6 is adapted to have a limited degree of floating movement in a vertical plane. The guides 17 and 18 and 19 and 20 are suitably disposed to allow such vertical motion of the seat back 6 to the degree desired, while permitting said seat back to raise sufficiently to disconnect the guides 17 and 18 from the guides 19 and 20 when it is desired to free the back 6 and seat 5 for repairs or replacement of parts or to permit the seat to be disconnected from the base 4 or thrown forward therewith to permit access to the storage compartment therebelow. The guides 17 and 18 and 19 and 20 preferably are of such size and have such a degree of sliding engagement as to ensure sliding connection between the seat back and seat back support within the full limits of the cushioning movements afforded by the springs 12.

The seat 5 is connected at its rear corners to the lower corners of the seat back 6 by hinge brackets 21 on the seat engaging hinge brackets 22 on the seat back, said bracket members 21 and 22, each or both of them, having elongated eyes or slots 23 to receive a detachable pivot pin or bolt 24, whereby the seat 5 and back 6 are coupled for vertical movements in unison and loosely connected to compensate also for their movements in different planes. Thus it will be understood that as the seat 5 rises and falls in its floating movements the seat back 6 will rise and fall therewith, but that while the rear edge of the seat may move in an arcuate path, the seat back will have a straight line motion because of its guide connections 17—20 with the seat back support, which motions are permitted and compensated for by the sliding and pivotal connection between the hinge brackets 21 and 22. By this means the lower portion of the seat back is prevented from moving backward and forward with the rear edge of the seat as the latter rises and falls and thus giving a very objectionable abrupt and fatiguing back and forth motion to the occupants of the seat. By hinging the seat at its forward edge a disagreeable and uncomfortable up and down rocking movement of this edge of the seat is prevented, such as would occur if the seat were pivoted at a point between its front and rear edges, and such mode of hinging the seat at its forward edge furthermore relieves the pivotal connections 21 and 24 from the excessively jerky motions which would occur if the seat were hinged between its front and rear edges. This seat is thus adapted to swing easily on a front pivotal support so that its swinging movement from front to rear is in a single direction on each swinging movement, as contradistinguished from a rocking movement in which the front portion of the seat moves downward while the rear edge of the seat moves upward, and vice versa. This swinging movement on a front pivotal support, besides reducing jerky motions causing annoyance and great riding fatigue, as well as undue wear and tear upon the seat elements, provides, for these reasons, for the more effective mounting of the cushioning springs for a cushioning action in a vertical plane close to but at one side of the pivotal connection between the rear edge of the seat and lower edge of the seat back, thus cushioning all shocks and jars so as to give velvety riding, the described mode of mounting the seat obviating the necessity of spring cushioning the seat over its entire area or at the front where an effective cushioning action can not be obtained and enabling a most efficient cushioning action to be obtained by either directly cushioning the seat itself at the rear, i. e., either immediately in rear of said pivotal connection, as in Figs. 1 to 8, inclusive, or cushioning the same in rear of said pivotal point through the action of the springs on the seat back, as in Figs. 10 to 14, inclusive. By this means also, in addition to the ordinary and usual cushioning springs and shock absorbing devices on the vehicle, a seat composed of parts themselves cushioned is also provided, and such cushioned seat parts are mounted to have a yielding floating motion which is suitably cushioned, whereby seat shocks and jars are compensated for and largely eliminated, to secure easy and velvety riding, ensuring greater comfort to driver and passengers of a vehicle and a reduction of riding fatigue and other discomforts.

It is desirable under many conditions of service to control the movements of the seat and seat back so as to maintain the seat in a level position with regard to its supporting means, so as to prevent any possibility of tilting or canting of the seat or seat back such as would be liable to result in binding of either the seat or the seat back and their cushioning or floating movements being interfered with. Such tilting or canting actions or binding might be caused, for example, by reason of the fact that one end of the seat 5 is weighted or occupied, for example, by a driver, while the other end of the seat is vacant or unoccupied, or the opposite ends of the seats may tend to be depressed to unequal degrees by occupants of different weights. In order to overcome this objection, in seat structures of certain types made according to my invention in which binding might possibly occur, I provide simple and effective equalizing means for maintaining the seat 5 in a level position irrespective of the load weight or weights carried thereby. This equalizing means may consist of a pair of rods, cables or like flexible elements 25 and 26 each secured at one end to a bracket plate 27 fastened to the rear portion of the seat 5 adjacent to each rear corner thereof, and thence passing downwardly and around a guide pulley 28 on the adjacent portion of the seat base 4, and thence extending upwardly and diagonally in the direction toward the upper corner of the seat back support 14 at the opposite side of the seat and passing around a pulley 29 at that point, and then having its opposite end depending at such side of the seat and connected at its lower end with the bracket 27 at the rear corner of the seat 5 at such side of the seat. By this arrangement it will be seen that the equalizing cables 25 and 26 are intermediately crossed and pass at or adjacent their opposite ends around guide pulleys 28 and 29 arranged respectively upon the seat base and seat back support at opposite sides of the seat and connected to opposite sides of the rear portion of the seat 5 so that said cables will be influenced by and shift with the seat 5 vertically and also with the seat 5 when either end thereof is depressed and the opposite end elevated. If, for example, the end of the seat 5 to which the depending end of cable 25 is connected should be depressed or tilted downwardly so as to tilt upwardly the opposite end to which the depending end of cable 26 is attached, such depending end of cable 25 will be drawn upon, and the opposite end of said cable 25 will be operated to pull the opposite end of the seat downward, so that counteracting pulls will be exerted to maintain the seat in a level position. Obviously a similar corrective or leveling action will be established when that end of the seat is depressed to which the depending end of cable 26 is attached, resulting in the opposite end of the cable being actuated to exert a down pull on the opposite end of the seat, whereby the seat will be maintained in a level position. Hence if one end of the seat is depressed by the weight of a driver or other person occupying the same, and the opposite end of the seat is not subjected to the same or similar weight, the seat nevertheless will be maintained in a level position by the leveling actions of the cables, and the same effect will be obtained in the event that persons of different weights occupy the seat 5 on opposite sides of its vertical center. Under some conditions, as in case of the application of the equalizer to a front seat of a weight to be occupied by a driver and one or two passengers, one of the cables may be dispensed with, since a certain weight, when the vehicle is in action, namely, that of the driver, is always present at one end of the seat and it may be sufficient, with some constructions, to use a single cable to pull the opposite end of the seat downward when such end of the seat is not occupied. The double or single cable equalizer constructions will be used, of course, on the seats upon each section or seat unit, in the case of a long seat having a single seat and single seat back, or a plurality of short seats arranged side by side, as in the case of coach seats or like independent seats arranged either at the front or rear of the vehicle.

In order to ensure ease of motion of the seat back 6 and to reduce friction between the coacting guide members 17 and 19 and 18 and 20 thereof, I may provide between each pair of guide members a suitable construction and arrangement of anti-friction bearing balls or rollers or like bearings 30 mounted and held in position in any suitable manner.

In Figs. 9 to 14, inclusive, I have shown a different mode of resiliently mounting and floatably cushioning the seat 5a and seat back 6a and have shown the application of the invention to a folding or swinging type of seat, such as a coach seat. As shown, the seat 5a is provided adjacent each of its front corners with hinge members 7a connected with hinge members 8a on the seat base 4a by pivot pins or bolts 9a, whereby the seat 5a is adapted to be disposed in a horizontal position or tilted forwardly to a substantially vertical or inclined position and to be detachably connected with its seat base 4a. The seat 5a is provided at its rear corners with hinge brackets 21a engaged with hinge bracket members 22a by pivot pins or bolts 24a slidably and pivotally engaging elongated eyes 23a formed on one or both bracket members. The hinge bracket members 22a, instead of being rigidly fastened to the seat back 6a, as in the case of the bracket members 22 in the previously described construction, form parts of independent hinges each comprising the member 22a and a member 22b on the seat back and connected thereto by a hinge pin or bolt 22c, the seat and seat back being thus coupled to move vertically in unison, while adapting the seat back to be folded over upon the top of the seat in the operation of folding or swinging the seat forward and of being swung backwardly to an operative position. Abutment or stop surfaces 22d are provided on the hinge members 22a and 22b to limit the rearward swinging movement of the seat back. The seat back 6a in this construction is mounted for vertical movement on a seat back support 14a which is mounted to swing therewith in the seat folding and unfolding operations, and said seat back support 14a is provided at its lower end with hinge supporting feet or legs 14b to rest upon the vehicle floor or seat base 4a when said seat back support is in working position. The seat back 6a is provided with a top stop bead or rail 15a for engagement with a corresponding part on the seat back support to limit the downward movement of the seat back. On the seat back are sliding guide sleeves or members 31 engaging guide rods 32 carried by brackets 33 on the seat back support 14a, and adjustably mounted on each rod 32 between the guides 33 is an abutment sleeve 34 adjustably secured in position by a set screw or the like, and between which and the superposed guide members 31 above and below the same are coiled supporting and cushioning springs 35 operating to support the weight of the seat 5a and the seat back 6a and to yieldingly cushion the same in their movements to adapt the seat parts to have a yielding floating motion in a vertical plane. This type of cushioning construction might, obviously, be employed in connection with the type of seat mounting disclosed in Figs. 1 to 8, inclusive, and, if desired, the equalizing device shown in Figs. 1 to 8, inclusive, may be used in the construction disclosed in Figs. 9 to 14, inclusive, where conditions are such as to render the use of such an equalizing device necessary or desirable.

The foregoing disclosures show the use of my invention in connection with fixed seats, namely, seats of non-folding type, such as the usual front and rear seats of sedans, and a seat of folding type, such as the front seats of coaches, but it is to be understood that I do not limit the invention in this or other respects, as the features of the invention, in whole or in part, may be employed in vehicle seats of all kinds having a seat proper and a seat back designed to be mounted for yielding floating movements.

In Figs. 15, 16 and 17 I have shown three of many different types of seats to which the invention is readily applicable. Fig. 15 shows a unitary type of seat, such as disclosed in Figs. 1 to 8, inclusive, embodying a single seat member 5 and a single back member 6. Fig. 16 shows the application of the invention to a divided or double seat comprising each a seat proper 5b and a seat back 6b, each of which may be of the non-folding type shown in Figs. 1 to 8, inclusive, or of the folding type shown in Figs. 9 to 14, inclusive, while Fig. 17 shows a seat structure embodying three independent seats arranged side by side and each comprising a seat proper 5c and a back 6c, which may be of either the non-folding or folding type. In case of the application of the invention to longitudinal seats, such as used in some types of street cars or coaches, it will be understood that each longitudinal seat may be made up of a row or series of unitary or individual folding type seats embodying the novel and improved features of my invention, whereby the desirable velvety riding afforded by my improved seat may be obtained in large vehicles of the character described.

From the foregoing description, taken in connection with the drawings, the construction, mode of operation and advantages of my improved vehicle seat will be readily understood and it will be seen that the invention provides a cushioned type of seat embodying a seat and a seat back having a floating motion and resiliently cushioned in its floating movements, in addition to the cushioning-action afforded by the usual cushioning means, so that easy and comfortable riding of kind which I call velvety riding may be obtained and various riding discomforts reduced or eliminated.

While the structures shown are preferred, it will be understood that they are disclosed as examples only, and that many changes in the form, proportions and details of construction of the various parts may be made within the scope of the invention as set forth in the appended claims, without departing from the spirit or sacrificing any of the advantages of the invention.

What I claim is:—

1. A vehicle seat comprising a seat mount embodying a horizontal seat supporting member and an upright seat back supporting member, a seat element pivoted at its front edge to said horizontal supporting member to swing about a horizontal axis, a seat back element in guided engagement with the upright seat back supporting member for up and down sliding movement in a straight line, a combined sliding and pivotal coupling between the rear edge of the seat element and lower portion of the seat back element uniting said elements for conjoint up and down motions, said connection adapting the rear edge of the seat element to swing in an arcuate path while the seat back element moves in a straight line, and means arranged on said seat mount engaging one of said elements to yieldingly sustain said elements for floating motion in unison.

2. A vehicle seat comprising a seat mount embodying a horizontal seat supporting member and an upright back supporting member, a seat element pivotally connected at its forward edge to the horizontal seat supporting member to swing bodily on a horizontal axis, a seat back element slidably engaging the upright back supporting member for up and down movements in a substantially straight line, a loose pivotal and sliding joint connection between the rear edge of the seat element and lower portion of the seat back element coupling said elements for conjoint movements so as to adapt the rear edge of the seat element to move freely without binding restriction in an arcuate path while the seat back member is moving in a straight line, and means on said seat mount arranged adjacent to but on one side of a vertical line passing through said joint connection and engaging one of said elements to yieldingly support said elements for floating movements in unison.

3. A vehicle seat comprising a seat mount embodying a horizontal seat supporting member and an upright seat back supporting member, a seat element pivoted at its front edge to said horizontal supporting member to swing about a horizontal axis, a seat back element in guided engagement with the upright seat back supporting member for up and down sliding movement in a straight line, a combined sliding and pivotal coupling between the rear edge of the seat element and lower portion of the seat back element uniting said elements for conjoint up and down motions, said connection adapting the rear edge of the seat element to swing in an arcuate path while the seat back element moves in a straight line, means on said seat mount yieldingly supporting said elements, and an equalizer on the seat mount housed substantially between the seat back element and seat back supporting member and comprising suspension elements connected to the seat element and in shifting engagement with the seat back supporting member for maintaining the seat element in a level position.

4. A vehicle seat comprising a seat mount embodying a horizontal seat supporting member and an upright seat back supporting member, a seat element pivoted at its front edge to said horizontal supporting member to swing about a horizontal axis, a seat back element in guided engagement with the upright seat back supporting member for up and down sliding movement in a straight line, a combined sliding and pivotal coupling between the rear edge of the seat element and lower portion of the seat back element uniting said elements for conjoint up and down motions, said connection adapting the rear edge of the seat element to swing in an arcuate path while the seat back element moves in a straight line, means on said seat mount yieldingly supporting said elements, and an equalizer on the seat mount housed substantially between the seat back element and seat back supporting member and comprising suspension cables connected to the seat element and in shifting engagement with the seat back supporting member for maintaining the seat element in a level position.

5. A vehicle seat comprising a horizontal seat support, a seat element pivotally mounted at its front edge upon said horizontal support to swing bodily on a horizontal axis, a seat back support, a seat back element having a sliding engagement with the seat back support for vertical movements in a straight line, a loose coupling connection between the rear edge of the seat element and lower portion of the seat back element comprising members operatively connected for pivotal and sliding motions to adapt the rear edge of the seat element to move in an arcuate path while the seat back element moves in a straight line, and means on the seat back support and disposed between the same and the seat back element and acting on said seat back element to yieldingly support the same and the seat element for floating movements in unison.

CLAUDE C. SALMONS.